United States Patent [19]
Kimoto et al.

[11] Patent Number: 5,151,322
[45] Date of Patent: Sep. 29, 1992

[54] THERMOPLASTIC COMPOSITE PLATE MATERIAL AND PRODUCTS MOLDED FROM THE SAME

[75] Inventors: Yukitane Kimoto, Otsu; Kohzou Murata, Nagoya; Toshio Muraki, Otsu, all of Japan

[73] Assignee: Toray Industries, Inc., Tokyo, Japan

[21] Appl. No.: 440,367

[22] Filed: Nov. 22, 1989

[30] Foreign Application Priority Data

Nov. 24, 1988 [JP] Japan .................. 63-296996

[51] Int. Cl.⁵ .................. B32B 7/00; B32B 9/04; B32B 27/14
[52] U.S. Cl. .................. 428/303; 428/225; 428/227; 428/286; 428/288; 428/435; 428/408
[58] Field of Search ........ 428/225, 227, 286, 288, 428/303, 435, 408

[56] References Cited

U.S. PATENT DOCUMENTS 4,339,490  7/1982  Yoshioka et al. .................. 428/302

FOREIGN PATENT DOCUMENTS 056703A  7/1982  European Pat. Off. .
48-8468  3/1973  Japan .
48-9958  3/1973  Japan .
5962112  10/1982  Japan .
6036136  8/1983  Japan .

OTHER PUBLICATIONS

Gordon J. Taylor, Stampable Carbon Fiber Reinforced Engineering Thermoplastics, 1981.
J. Composite Materials, vol. 3 (Oct. 1969), p. 732.

Primary Examiner—Patrick J. Ryan
Assistant Examiner—Richard Weisberger
Attorney, Agent, or Firm—Birch, Stewart, Kolasch & Birch

[57] ABSTRACT

A thermoplastic composite plate material having a quasi isotropy comprises a thermoplastic resin having a melt viscosity of 1,000-15,000 poise and strip pieces each constructed of unidirectionally orientated reinforcing fibers and each having the specific dimensions of the thickness, the width, the length and the ratio of the width and the length thereof. The strip pieces are randomly distributed in plane parallel to a surface of the composite plate material. Since the composite plate material has good quasi-isotropic and high mechanical properties such as flexural strength, flexural modulus and impact strength, a composite product having good quasi-isotropic and high mechanical properties can be obtained by using the composite plate materials. Moreover, since the composite plate material has a good fittability, a composite product having a complicated shape can be easily molded.

10 Claims, 11 Drawing Sheets

FIG. IOA
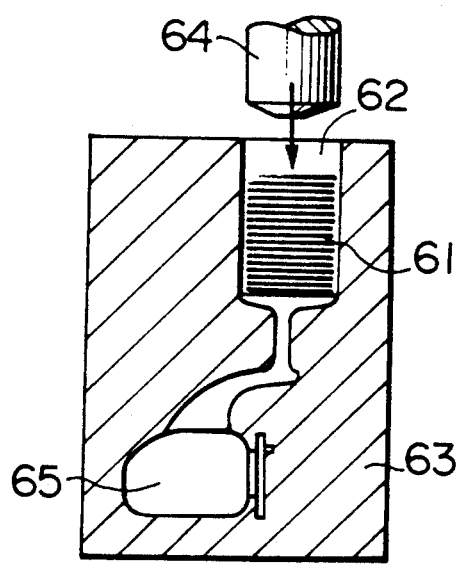
FIG. IOB
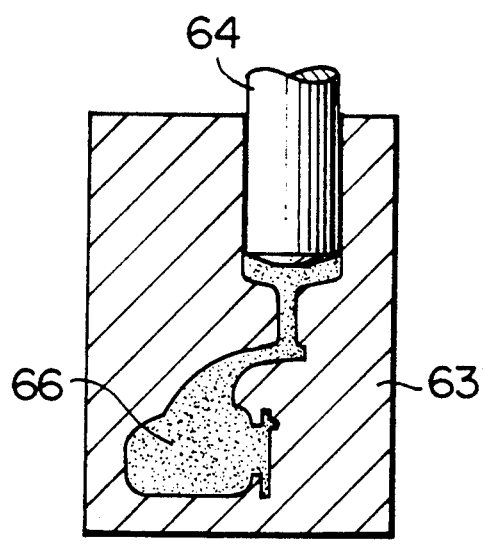
FIG. IOC
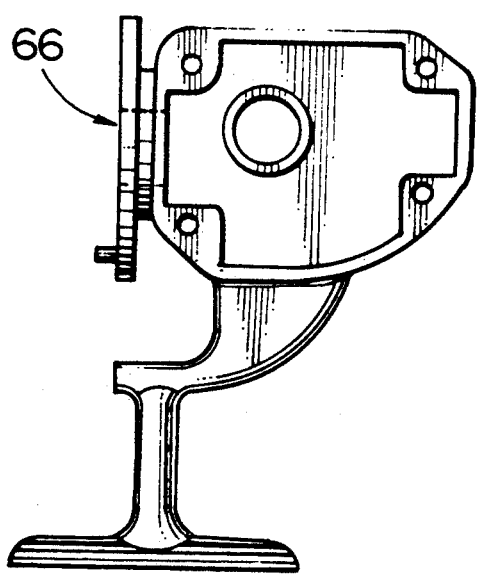
FIG. IOD
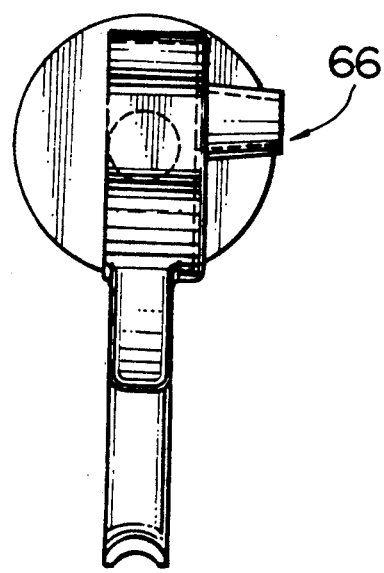

THERMOPLASTIC COMPOSITE PLATE MATERIAL AND PRODUCTS MOLDED FROM THE SAME

BACKGROUND OF THE INVENTION

1. Field of the Invention

The present invention relates to a composite plate material of a thermoplastic resin and reinforcing fibers (hereinafter referred to as FRTP plate) suitable in use for molding various products constructed from a composite material of the thermoplastic resin and reinforcing fibers (fiber reinforced thermoplastics, hereinafter referred to as FRTP) by stamping or press flow molding method etc., and relates to products molded out of the composite plate material or materials (hereinafter referred to as FRTP products).

2. Description of the Prior Art

Various FRTP plates are known. There are two types of FRTP plates, using excessively long reinforcing fibers and using excessively short reinforcing fibers. Typical FRTP plate of the former type comprises unidirectionally oriented reinforcing fibers, or reinforcing fibers formed as a fabric or a swirl mat. Typical FRTP plate of the latter type comprises reinforcing fibers formed as a chopped strand mat formation. Although both types of FRTP plates have respective characteristics, recently the former having higher mechanical properties has been more noted than the latter from the viewpoint of use of FRTP material for various mechanical parts which has been broadly developed.

The former type of FRTP plates, which use excessively long reinforcing fibers, are disclosed in, for example, JP-B-63-37694 and JP-A-60-36136. The FRTP plates disclosed in these publications are composites of thermoplastic resins and reinforcing fibers orientated in one direction parallel to one another in the form of a sheet. Since the reinforcing fibers are unidirectionally orientated in these FRTP plates, they are very suitable in the case where a product to be molded requires a directivity in its mechanical properties. However, in the case where a quasi isotropy is required for the mechanical properties of a product to be molded, it is required that a plurality of the FRTP plates must be laminated and arranged so as to gradually shift the directions of the reinforcing fibers of the laminated plates when the product is molded. In this molding, if the lamination structure of the FRTP plates is not adequately determined, the anisotropic properties of the molded product increase.

The FRTP plates of reinforcing fibers formed as a fabric or a swirl mat are disclosed in, for example, the above-described JP-B-63-37694, JP-B-48-8468 and JP-B-48-9958. The FRTP plates having these formations in reinforcing fibers have anisotropies smaller than those of the FRTP plates using unidirectionally orientated reinforcing fibers. However, the FRTP plate of reinforcing fibers formed as a fabric is not suitable for molding an FRTP product having a complicated shape such as a shape having many curved surfaces and/or many corners even if an FRTP product having a simple shape such as a plane plate can be easily molded, because the structural stability of a fabric, wherein warp fibers and weft fibers cross crimp each other, is high, and therefore, the fittability of the FRTP plate in molding to a complicated shape is not good. Also in the FRTP plate of reinforcing fibers formed as a swirl mat, the fittability thereof is not good though the anisotropic properties thereof are smaller than those of the FRTP plate of a reinforcing fiber fabric. Therefore, it is difficult to uniformly distribute the reinforcing fibers in a molded FRTP product because the reinforcing fibers of the FRTP plate lack in fluidity during molding.

On the other hand, the FRTP plate of excessively short reinforcing fibers formed as a chopped strand mat has an excellent fittability higher than that of any above-described FRTP plate, and can be relatively easily served to mold an FRTP product having a complicated shape. However, since the reinforcing fibers are short and it is difficult to increase the volume content of the reinforcing fibers in the FRTP plate or the FRTP product, the reinforcement effect due to the reinforcing fibers cannot be greatly increased, and therefore, the mechanical properties of the molded FRTP product are not high.

To solve such a problem, JP-A-59-62112 proposes that, after a thermoplastic resin is impregnated into or applied on the bundle of reinforcing fibers, the bundle including the thermoplastic resin is cut to many bundle pieces each of which has an excessively long length comparing to its width, the bundle pieces are disposed in a required form and the disposed bundle pieces are heated and pressed. According to this process, the thermoplastic resin is impregnated into the reinforcing fibers more completely and the volume content of the reinforcing fibers can be increased to some extent. Therefore, the mechanical properties of the molded FRTP product using the bundle pieces also can be increased to some extent. However, the degree of the increase is not sufficient to satisfy the objects of the present invention at all.

Moreover, the common problem in FRTP materials or FRTP products comprising relatively short reinforcing fibers is that the impact resistance thereof is relatively low.

SUMMARY OF THE INVENTION

Accordingly, an object of the present invention is to provide an FRTP plate having both the advantage of high mechanical properties caused by using fairly long reinforcing fibers and the advantage of good fittability caused by using fairly short reinforcing fibers, thereby easily molding an FRTP product having high mechanical properties.

Another object of the present invention is to provide an FRTP plate having an excellent quasi-isotropic property, thereby making a quasi-isotropic FRTP product easily.

A further object of the present invention is to provide various molded FRTP products which can have excellent mechanical properties by using the FRTP plates.

To accomplish the above objects, a composite plate material (FRTP plate) according to the present invention has a quasi isotropy in plane thereof and comprises a thermoplastic resin having a melt viscosity of 1,000–15,000 poise at the temperature which the composite plate material is formed and strip pieces each constructed of unidirectionally orientated reinforcing fibers. The strip pieces are randomly distributed in plane parallel to a surface of the FRTP plate. Each of the strip pieces has the dimensions of a) the thickness not greater than 0.2 mm, b) the width in the direction perpendicular to the reinforcing fiber orientated direction in the range of 2–25 mm, c) the length in the reinforcing fiber orientated direction in the range of 5–30 mm, and d) the ratio of the width and the length in the range of 0.15–1.5.

The FRTP plate according to the present invention comprises a thermoplastic resin and strip pieces of reinforcing fibers. The thermoplastic resin has a melt viscosity of 1,000–15,000 poise at the temperature which the FRTP plate is formed. Each of the strip pieces is constructed of unidirectionally orientated reinforcing fibers. Each of the strip pieces is formed as a small composite plate piece 1, constructed of unidirectionally orientated reinforcing fibers 2 and a thermoplastic resin 3 pre-impregnated into the reinforcing fibers as shown in FIG. 2, or formed as a strip piece constructed of only unidirectionally orientated reinforcing fibers, as described later. The strip pieces are randomly distributed in plane parallel to a surface of a composite plate (FRTP plate) 4, and the FRTP plate 4, as shown in FIG. 1, is composed of reinforcing fibers 2 and the thermoplastic resin 3 in the manners described later.

In the FRTP plate according to the present invention, a thermoplastic resin having a melt viscosity of 1,000–15,000 poise at the temperature which the FRTP plate is formed can be used. As such a thermoplastic, polyamide resin such as nylon 6, nylon 66, nylon 610 and nylon 612, or co-polyamide resin of these polyamide resins can be used. Also, polyester resin such as polyethylene terephthalate and polybutylene terephthalate, or co-polyester resin of these polyester resins can be used. Further, a thermoplastic resin such as polycarbonate, polyamide-imide, polyphenylene sulfide, polyphenylene oxide, polysulfone, polyether sulfone, polyether-ether-ketone, polyolefin and polyether-imide can be used. Furthermore, the thermoplstic resin can be selected from thermoplastic elastomers such as polyurethane elastomer, polyester elastomer and polyamide elastomer.

The melt viscosity of the thermoplastic resin at a temperature which the FRTP plate is formed is measured by a capilary type viscometer. The actual measurement is carried out at just or near the temperature which the FRTP plate is formed and in the area of low shear rate, S in FIG. 3 which shows the typical relationship between shear rate and melt viscosity. As shown in FIG. 3, there are almost no effects of the shear rate on the melt viscosity in the area S. The measurement temperature is selected from the range higher than the melting point and lower than the decomposition point in a crystalline resin and from the range higher than the softening point and lower than the decomposition point in a non-crystalline resin.

The reinforcing fibers are selected as at least one kind of fibers from high strength and high elastic modulus fibers such as carbon fibers, glass fibers, polyaramid fibers, alumina fibers, alumina-silica fibers and silicon carbide fibers. The content of the reinforcing fibers is in the range of 20–60 vol.%, preferably 30–50 vol.%.

In the present invention, the FRTP plate or the FRTP product can have a hybrid structure by using two or more kinds of thermoplastic resins and/or two or more kinds of reinforcing fibers.

In the FRTP plate according to the present invention, the melt viscosity of the thermoplastic resin and the length and width of the strip piece are very important to achieve the aforementioned objects.

Since the strip pieces are randomly distributed in plane parallel to a surface of the FRTP plate, the strip pieces are laminated at least partially to one another. Thus, there exist fine clearances in the laminated portions, or portions where the thermoplastic resin is rich if the thermoplastic resin is not uniformly impregnated into the reinforcing fibers. A stress concentration occurs predominantly at these portions, when an external force is applied and the fracture of the FRTP plate starts at the portions and propagates. The melt viscosity of the thermoplastic resin is very important to prevent this stress concentration. Namely, if the melt viscosity of the thermoplastic resin is lower than 1,000 poise, the thermoplastic resin is liable to stick out from the strip piece of the reinforcing fibers and/or the alignment of the reinforcing fibers is liable to be disturbed by the excessive flow of the resin, when the resin is impregnated into the reinforcing fibers. The sticking out of the thermoplastic resin causes the non-uniform distribution of the reinforcing fibers in the resin of the FRTP plate, thereby causing stress concentration at the non-uniform portions and deterioration of the mechanical properties of the FRTP plate and the FRTP product. The disturbance of the reinforcing fibers also causes the deterioration of the mechanical properties. If the melt viscosity of the thermoplastic resin is higher than 15,000 poise, the impregnation of the resin into the reinforcing fibers deteriorates. Further, even if the impregnation of the thermoplastic resin is not so bad, the clearances at the laminated portions of the strip pieces in the FRTP plate are liable to remain because the configuration holding ability of each strip piece including the thermoplastic resin increases.

Thus, the melt viscosity of the thermoplastic resin is important to form an FRTP plate which has no clearances at the positions where the strip pieces laminate to one another and which has no resin-rich portion. Moreover, if the melt viscosity of the thermoplastic resin in the FRTP plate is in the above-described range (i.e. 1,000–15,000 poise), the reinforcing fibers impregnated with the resin appropriately move, the fittability of the FRTP plate improves and the distribution of the reinforcing fibers in an FRTP product becomes more uniform when the FRTP plate is heated and pressed to mold the FRTP product, because the temperature of the molding for the FRTP product is generally similar to the temperature at which the FRTP plate is formed.

The thickness of the strip pieces is not greater than 0.2 mm in the present invention. By observing carefully the failure process in the FRTP plate to which an external force is being applied, it is understood that the stress to be distributed uniformly along the reinforcing fibers concentrates at the positions where the strip pieces laminate to one another and the lamination positions are apt to become starting points for the breakage of the FRTP plate. This is caused by such a lamination state as shown in FIG. 4 wherein the strip piece 5 of the reinforcing fibers is bent in the thickness direction of the strip piece at the lamination position 6 and the position near the lamination position. The thickness of the strip pieces must be sufficiently small to suppress the stress concentration due to the bending of the strip pieces to a small extent. From this point of view, the thickness of the strip pieces in the present invention is determined to be not greater than 0.2 mm, preferably 0.1 mm. The thickness of the strip piece in the present invention means the thickness of the reinforcing fibers constituting the strip piece. In the case where the thermoplastic resin is pre-impregnated into the reinforcing fibers constituting the strip piece to form a small composite plate piece constructed of the thermoplastic resin and the reinforcing fibers, the thickness of the strip piece of the reinforcing fibers can be measured in the cross section of the small composite plate piece. However, the thickness of the strip pieces constructed of the reinforcing fibers can be determined to be almost the same as the thickness t (FIG. 2) of the small composite plate piece constructed of the reinforcing fibers and the thermoplastic resin in the present invention.

With respect to the relationship between the width W (FIG. 2) of the strip piece and the mechanical properties of the FRTP plate, the width of the strip piece greatly affects the impact resistance of the FRTP plate. Namely, the larger the width of the strip piece is, the higher the Charpy or Izod impact strength of the strip piece becomes. This is due to the fact that each strip piece impregnated with the thermoplastic resin is regarded as a small FRTP plate including unidirectionally orientated reinforcing fibers, such a small FRTP plate can have a high deformation resistance in accordance with bending, buckling or shear, and therefore, the small FRTP plate (the strip piece including the resin) having a larger width is more profitable for increase of its impact resistance.

On the other hand, when the failure mode of the FRTP plate to which an external force was applied is observed, it is revealed that the initial breakage occurs at the end positions of the strip pieces in the direction parallel to the reinforcing fibers because the stress due to the external force concentrates on the end portions of the reinforcing fibers. Therefore, if the width of the strip pieces is large too much in comparison with the length L (FIG. 2) of the strip pieces, the FRTP plate cannot have high mechanical properties because the area or the rate of the stress concentrated portions in the FRTP plate increases. Accordingly, an adequate range to be selected exists with respect to the relationship between the width and length of the strip piece. In the present invention, the width of the strip piece is set in the range of 2-25 mm, preferably 5-20 mm, and the ratio of the width and length of the strip piece is set in the range of 0.15-1.5, preferably 0.2-1.0. If the width of the strip pieces is smaller than 2 mm, it is difficult to present the above-described operation of the small composite plate piece constructed of the reinforcing fibers and the thermoplastic resin, and the impact resistance of the FRTP plate decreases. If the width of the strip pieces is larger than 25 mm, the impact resistance and other mechanical properties of the FRTP plate also decreases because the degree of the stress concentration at the end portions of the strip pieces increases. Since the affection at the end portions of the strip pieces to the stress concentration is also connected with the length of the strip pieces, however, if the ratio of the width and length of the strip pieces is smaller than 0.15, i.e. the strip pieces are longer and more slender pieces, the impact resistance of the FRTP plate decreases from the above-described reason even if the affection at the end portions of the strip pieces decreases. On the other hand, if the ratio is larger than 1.5, the affection at the end portions of the strip pieces increases, and therefore, an FRTP plate having high mechanical properties cannot be obtained.

The relationship between the rigidity of such an FRTP plate according to the present invention and the length of the reinforcing fibers used for the FRTP plate can be determined by modified Halpin-Tsai equation (J. C. Halpin, J. of Composite Materials, vol. 3, page 732, 1969). According to this equation, the longer the reinforcing fibers are, the higher the rigidity of the FRTP plate becomes, but if the length of the reinforcing fibers is larger than a certain value, the contribution due to the length of the reinforcing fibers to the increase of the rigidity decreases. On the other hand, in a press flow molding method, for example, the reinforcing fibers having a smaller length can move more easily, thereby obtaining an FRTP product having a complicated shape more easily. From these points of view, the length of the reinforcing fibers, i.e. the length of the strip pieces, must be selected from the range of 5-30 mm, more preferably 10-25 mm, to form an FRTP plate excellent in practical use and having high mechanical properties. If the length of the strip pieces is smaller than 5 mm, the rigidity of the FRTP plate and the FRTP product obtained decreases to a great extent. Moreover, the width of the strip pieces must be reduced corresponding to the small length of the strip pieces to ensure high flexural properties, but the FRTP plate or product using such strip pieces deteriorates in impact resistance. If the length of the strip pieces is larger than 30 mm, it is difficult to obtain a good quasi-isotropic property of the FRTP plate and uniformly distribute the reinforcing fibers in the FRTP plate and FRTP product because the fluidity of the reinforcing fibers decreases in forming process of the FRTP plate and molding process of the FRTP product, even if the rigidity of the FRTP plate or product increases.

The FRTP plate according to the present invention is formed as follows.

In a first method, the strip pieces are made as small composite plate pieces constructed of the reinforcing fibers and the thermoplastic resin pre-impregnated thereinto before the FRTP plate is formed. For example, the bundle of reinforcing fibers is continuously coated with the molten thermoplastic resin by extrusion, the coated bundle of reinforcing fibers is passed between a pair of rollers heated at a temperature higher than the melting point of the thermoplastic resin, the impregnation of the resin into the reinforcing fibers and the flattening of the bundle including the resin and the reinforcing fibers are carried out by pressing the bundle between the pair of rollers, and thereafter, the bundle flattened and impregnated with the resin is cut at a predetermined length to make strip pieces including the reinforcing fibers and the thermoplastic resin. Alternatively, the bundle of reinforcing fibers already impregnated with the thermoplastic resin is continuously touched onto a bar heated at a temperature higher than the melting point of the thermoplastic resin, the bundle is widened and flattened, and thereafter, the bundle is cut at a predetermined length to make strip pieces.

The strip pieces including the thermoplastic resin are randomly distributed in a cavity of a mold in order that they are randomly oriented in plane parallel to a surface of an FRTP plate to be formed. Then the mold is closed, and the distributed strip pieces are heated and pressed to form the FRTP plate by compression molding.

In a second method, the strip pieces are made as pieces constructed of only reinforcing fibers before the step of forming the FRTP plate. For example, the bundle of the reinforcing fibers impregnated with a sijing agent is widened to predetermined width and thickness, the widened bundle is cut at a predetermined length to make strip pieces of the reinforcing fibers, and the strip pieces with a required cut length are randomly distributed in plane parallel to a surface of an FRTP plate to be formed. The powder of thermoplastic resin are scattered on the distributed strip pieces or the distributed strip pieces are sandwiched by films of thermoplastic resin, and the strip pieces with the thermoplastic resin powder or the strip pieces sandwiched by the thermoplastic resin films are heated and pressed at a temperature higher than the melting point of the thermoplastic resin to form the FRTP plate required.

In the FRTP plate thus obtained, the strip pieces of the unidirectionally orientated reinforcing fibers are randomly distributed in plane parallel to a surface of the FRTP plate and the strip pieces are randomly laminated and connected to one another by the thermoplastic resin. This random lamination and distribution of the strip pieces results in the sufficient quasi-isotropic properties of the FRTP plate in plane thereof. In the present invention, that an FRTP plate is a quasi-isotropic means that the FRTP plate is in the status wherein the mechanical properties of the FRTP plate in any two directions perpendicular to each other and in the direction with an angle of 45 degrees to the above directions in the plane of the FRTP plate are in the range of ±10% in the dispersion of the mechanical properties.

The FRTP plate according to the present invention has the thickness of, for example, 0.5-20 mm, more preferably 2-10 mm, and includes a relatively thin plate which is generally called a sheet.

The FRTP plate or plates obtained are served to mold various FRTP products as described later in examples.

BRIEF DESCRIPTION OF THE DRAWINGS

The accompanying drawings illustrate several embodiments of the invention and together with the description serve to explain the principles of the invention.

FIGS. 10A and 10B are vertical sectional views of molds and composite plates showing the molding of a further FRTP product according to a further embodiment of the present invention, FIG. 10C is a plan view of the molded FRTP product and FIG. 10D is a side view of the molded FRTP product.

DETAILED DESCRIPTION OF THE PREFERRED EMBODIMENTS

Figure 1:
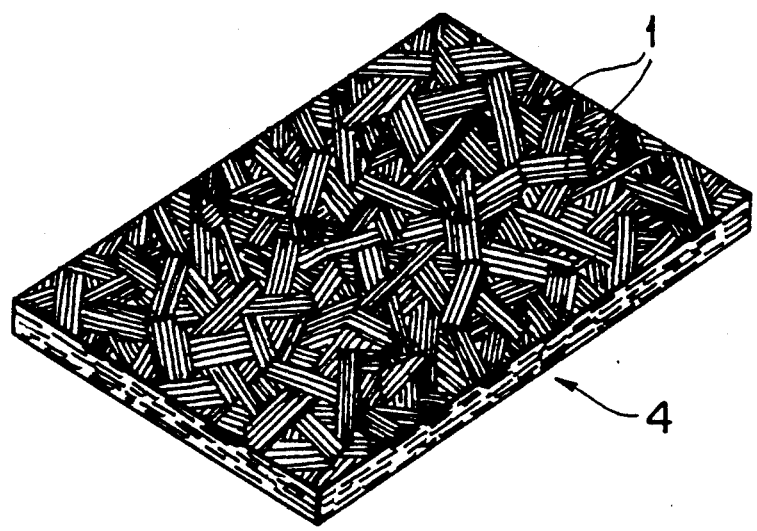
FIG. 1 is a perspective view of a composite plate according to an embodiment of the present invention.
Figure 2:
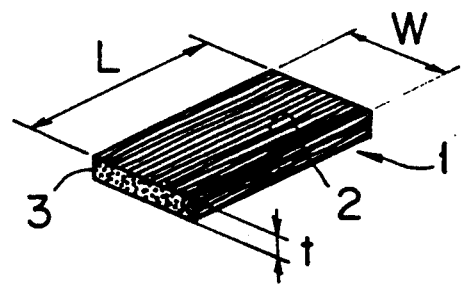
FIG. 2 is a perspective view of a strip piece including a thermoplastic resin used for forming the composite plate shown in FIG. 1.
Figure 3:
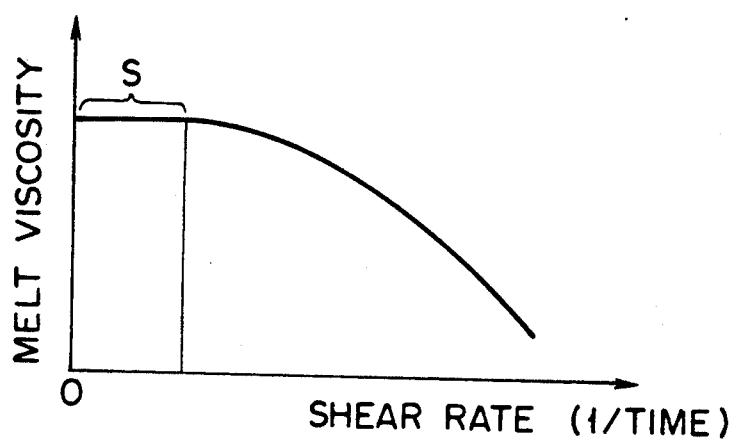
FIG. 3 is a graph showing a typical relationship between the melt viscosity and the shear rate of a thermoplastic resin and a measurement area for determining the melt viscosity of the thermoplastic resin according to the present invention.
Figure 4:
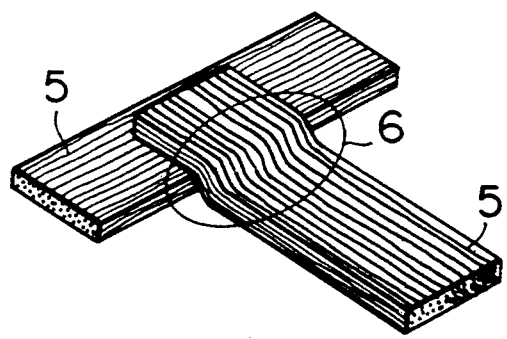
FIG. 4 is a side view of two strip pieces including a thermoplastic resin, showing an example of the lamination state of the strip pieces according to the present invention.

Some preferred embodiments of the present invention will be described hereunder with reference to the attached drawings.

EXAMPLE 1-3, COMPARATIVE EXAMPLES 1 and 2

In Example 1, the nylon 6 "AMILAN" CM1010 (the melt viscosity at 250° C.: 3,000 poise) produced by Toray Industries, Inc. is extruded at 260° C. around the glass multifilament "ER550" (the diameter of a single filament: 17 $\mu$m, the number of filaments: 1,000) produced by Nippon Electric Glass Co., Ltd., and a glass multifilament coated with nylon 6, having glass fiber content of 40 vol.%, is obtained. After the obtained glass multifilament with nylon 6 is preheated to a temperature of 260° C. by a far infrared radiation heater, the glass multifilament with nylon 6 is pressed by a pair of rollers heated at 260° C. to form a tape having the width of 6 mm and the thickness of 0.09 mm.

The tape obtained is cut to make strip pieces impregnated with nylon 6 and having the length of 6 mm. When the cross section of each strip piece obtained is observed, it is evident that the glass fibers are distributed up to both the surfaces of the strip piece, and therefore, the thickness of the glass fibers constituting the strip piece is substantially the same as that of the strip piece including the nylon 6. The strip pieces are distributed in a cavity of a mold, and compression molded at 260° C. to form an FRTP plate having the thickness of 3 mm. Thus the FRTP plate according to an embodiment of the present invention is obtained.

In Example 2, the length of strip pieces is set to 13 mm. Other conditions are the same as those in Example 1.

In Example 3, the length of strip pieces is set to 25 mm. Other conditions are the same as those in Example 1.

In Comparative Example 1, the length of strip pieces is set to 3 mm. Other conditions are the same as those in Example 1.

In Comparative Example 2, the length of strip pieces is set to 40 mm. Other conditions are the same as those in Example 1.

According to ASTM-D-790, the samples are made from the FRTP plates obtained in Examples 1 to 3 and Comparative Examples 1 and 2, and the flexural properties (flexural strength and flexural modulus) of the respective of samples are determined. As shown in Table 1, the flexural properties of the FRTP plate having the longer strip pieces i.e. longer glass fibers can increase in comparison with those of the FRTP plate having the shorter strip pieces.

TABLE 1

|  | Length of strip piece (mm) | Flexural strength (kgf/mm$^2$) | Flexural modulus (kgf/mm$^2$) |
| --- | --- | --- | --- |
| Com. Ex. 1 | 3 | 21 | 1130 |
| Ex. 1 | 6 | 27 | 1210 |
| Ex. 2 | 13 | 31 | 1250 |
| Ex. 3 | 25 | 41 | 1300 |
| Com. Ex. 2 | 40 | 43 | 1320 |

Nest, the samples extending in the direction of angles of 0 degree, 45 degrees and 90 degrees on the respective FRTP plates obtained in Examples 1, 2 and 3 are taken out from the respective FRTP plates. The flexural properties of the respective samples of each FRTP plate are determined. As shown in Table 2, it is understood that all the FRTP plates obtained in Examples 1 to 3 are good quasi-isotropic in their plane directions.

TABLE 2

| Angle | Flexural strength (kgf/mm$^2$) | | | Flexural modulus (kgf/mm$^2$) | | |
| --- | --- | --- | --- | --- | --- | --- |
|  | 0° | 45° | 90° | 0° | 45° | 90° |
| Ex. 1 | 27 | 28 | 27 | 1210 | 1230 | 1200 |
| Ex. 2 | 31 | 29 | 32 | 1250 | 1210 | 1290 |
| Ex. 3 | 41 | 38 | 40 | 1300 | 1350 | 1340 |

Figure 5A:
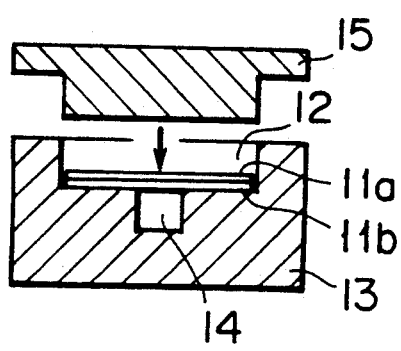
FIGS. 5A and 5B are vertical sectional views of molds and composite plates used in a test for determining the fluidity of reinforcing fibers included in the composite plates.
Figure 5B:
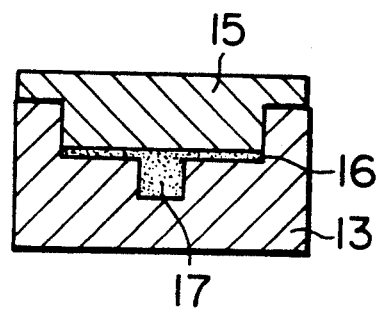

Next, the respective FRTP plates obtained in Examples 1 to 3 and Comparative Examples 1 and 2 are heated at 280° C. by a far infrared radiation heater, and the same kind of the heated FRTP plates 11a and 11b are stacked by two in a cavity 12 of an lower mold 13 as shown in FIG. 5A. The cavity 12 has a cylindrical recessed portion 14 having the depth of 10 mm and the inner diameter of 10 mm on its central portion. An upper mold 15 is closed and pressed at a pressure of 100 kgf/cm$^2$ to mold an FRTP product 16 having the thickness of 4 mm in its plate portion and the projection 17 (height: 10 mm, diameter: 10 mm) in its central portion, as shown in FIG. 5B.

After molding respective FRTP products 16, projections 17 are cut away from the respective FRTP plates, nylon 6 is burnt off from the respective cut projections, and the volume contents of the glass fibers in the respective projections are determined by measuring the volumes of the remaining glass fibers in the respective burnt projections. As shown in Table 3, in the projection molded from the FRTP plates obtained in Comparative Example 2 wherein the length of the glass fibers is larger than the range according to the present invention, the volume content of the glass fibers is low because the glass fibers do not sufficiently flow into the projection portion.

TABLE 3

|  | Length of strip piece (mm) | Volume content of glass fibers (vol. %) |
| --- | --- | --- |
| Com. Ex. 1 | 3 | 40 |
| Ex. 1 | 6 | 40 |
| Ex. 2 | 13 | 40 |
| Ex. 3 | 25 | 37 |
| Com. Ex. 2 | 40 | 28 |

EXAMPLES 4 AND 5, COMPARATIVE EXAMPLES 3 AND 4

In Example 4, a nylon 6 having the melt viscosity of 3,000 poise at 260° C. is extruded at 260° C. around the bundle of carbon fibers "TORAYCA" T300-6K (the diameter of a single fiber: 7 μm, the number of fibers: 6,000) produced by Toray Industries, Inc., and a bundle of carbon fibers coated with nylon 6, having carbon fiber content of 30 vol.%, is obtained. After the obtained carbon fiber bundle with nylon 6 is preheated to a temperature of 260° C. by a far infrared radiation heater, the bundle with nylon 6 is pressed by a pair of rollers heated at 260° C. to form a tape having the width of 6 mm and the thickness of 0.13 mm.

The tape obtained is cut to make strip pieces impregnated with nylon 6 and having the length of 13 mm. The strip pieces are distributed in a cavity of a mold, and compression molded at 260° C. to form an FRTP plate having the thickness of 3 mm.

In Example 5, a nylon 6 having the melt viscosity of 12,000 poise at 260° C. is used. Other conditions are the same as those in Example 4.

In Comparative Example 3, a nylon 6 having the melt viscosity of 500 poise is used. Other conditions are the same as those in Example 4. In this Comparative Example, there are many portions where the nylon 6 have sticked out from the strip pieces of carbon fibers, and the width of the strip pieces disperses relatively greatly.

In Comparative Example 4, a nylon 6 having the melt viscosity of 17,000 poise is used. Other conditions are the same as those in Example 4. In this Comparative example, the nylon 6 cannot uniformly impregnate into the bundle of carbon fibers, and the obtained strip pieces with the nylon 6 have voids.

According to ASTM-D-790, the samples are made from the FRTP plates obtained in Examples 4 and 5 and Comparative Examples 3 and 4, respectively, and the flexural strength of the respective samples are determined. As shown in Table 4, the flexural strength of the FRTP plate using nylon 6 having the melt viscosity of 500 poise lower than the range according to the present invention or the melt viscosity of 17,000 poise higher than the range, is lower than that of the FRTP plate using nylon 6 having a melt viscosity within the range.

TABLE 4

|  | Melt viscosity (poise) | Flexural strength (kgf/mm$^2$) |
| --- | --- | --- |
| Com. Ex. 3 | 500 | 25 |
| Ex. 4 | 3,000 | 31 |
| Ex. 5 | 12,000 | 29 |

TABLE 4-continued

|  | Melt viscosity (poise) | Flexural strength (kgf/mm²) |
| --- | --- | --- |
| Com. Ex. 4 | 17,000 | 17 |

EXAMPLES 6–9, COMPARATIVE EXAMPLES 5 AND 6

In Example 6, the bundle of carbon fibers "TORAYCA" T300-12K (the diameter of a single fiber: 7 μm, the number of fibers: 12,000) is used, and a tape with nylon 6 having the thickness of 0.09 mm and the width of 24 mm is obtained in a manner similar to that in Example 1. Strip pieces having the length of 25 mm and the width of 6 mm are made from the tape, and an FRTP plate is made using the strip pieces in the same manner as that in Example 1.

In Example 7, strip pieces are cut at the length of 25 mm and the width of 12 mm. Other conditions are the same as those in Example 6.

In Example 8, strip pieces are cut at the length of 25 mm and the width of 24 mm. Other conditions are the same as those in Example 6.

In Example 9, strip pieces are cut at the length of 20 mm and the width of 24 mm. Other conditions are the same as those in Example 6.

In Comparative Example 5, strip pieces are cut at the length of 25 mm and the width of 2 mm. In Comparative Example 6, strip pieces are cut at the length of 13 mm and the width of 24 mm. Other conditions are the same as those in Example 6.

According to ASTM-D-256, the samples are made from the FRTP plates obtained in Examples 6 to 9 and Comparative Examples 5 and 6, and unnotched Izod impact tests are carried out with respect to the respective samples. As shown in Table 5, the impact resistance of the FRTP plate using the strip pieces having the ratio of the width and the length lower than the range according to the present invention or the ratio higher than the range, is lower than that of the FRTP plate using the strip pieces having a ratio within the range.

TABLE 5

|  | Length of strip piece (mm) | Width of strip piece (mm) | Ratio of width/length | Izod impact value (kgf.cm/cm²) |
| --- | --- | --- | --- | --- |
| Com. Ex. 5 | 25 | 2 | 0.08 | 25 |
| Ex. 6 | 25 | 6 | 0.24 | 40 |
| Ex. 7 | 25 | 12 | 0.48 | 42 |
| Ex. 8 | 25 | 24 | 0.96 | 38 |
| Ex. 9 | 20 | 24 | 1.20 | 35 |
| Com. Ex. 6 | 13 | 24 | 2.08 | 28 |

EXAMPLES 10 AND 11, COMPARATIVE EXAMPLE 7

In Example 10, the bundle of carbon fibers "TORAYCA" T300-12K (the diameter of a single fiber: 7 μm, the number of fibers: 12,000) is used, and the bundle coated with nylon 6 is obtained in a manner similar to that in Example 1. After the carbon fiber bundle with nylon 6 is preheated to a temperature of 260° C. by a far infrared radiation heater, the bundle is pressed between a pair of rollers which are heated to a temperature of 260° C., one of which has a groove extending in the circumferential direction of the roller and having the width of 12 mm and the other of which has a projection extending in the circumferential direction of the roller and having the width corresponding to the width of the groove, to make a tape having the width of 12 mm and the thickness of 0.08 mm. Strip pieces including nylon 6 and having the length of 25 mm are made by cutting the tape. The strip pieces obtained are distributed in a cavity of a mold, and the distributed strip pieces are compression molded at 260° C. to form an FRTP plate having the thickness of 3 mm.

In Example 11, two bundles coated with nylon 6, which are obtained in Example 10, are laminated to each other, and the laminated bundles are pressed by the pair of rollers used in Example 10 to make a tape having the width of 12 mm and the thickness of 0.16 mm. The tape obtained is cut to strip pieces having the length of 25 mm, and an FRTP plate having the thickness of 3 mm is formed using the strip pieces in the same manner as that in Example 10.

In Comparative Example 7, three bundles coated with nylon 6, which are obtained in Example 10, are laminated to each other, and the laminated bundles are pressed by the pair of rollers used in Example 10 to make a tape having the width of 12 mm and the thickness of 0.24 mm. The tape obtained is cut to strip pieces having the length of 25 mm, and an FRTP plate having the thickness of 3 mm is formed using the strip pieces in the same manner as that in Example 10.

The flexural properties of the FRTP plates obtained in the above Examples 10 and 11 and Comparative Example 7 are determined in the same manner as that in Example 1. As shown in Table 6, the flexural strength and flexural modulus of the FRTP plate using the strip pieces having the thickness larger than the range according to the present invention, are lower than those of the FRTP plates using the strip pieces having the thickness within the range.

TABLE 6

|  | Length of strip piece (mm) | Thickness of strip piece (mm) | Flexural strength (kgf/mm²) | Flexural modulus (kgf/mm²) |
| --- | --- | --- | --- | --- |
| Ex. 10 | 25 | 0.08 | 50 | 2,500 |
| Ex. 11 | 25 | 0.16 | 48 | 2,430 |
| Com. Ex. 7 | 25 | 0.24 | 35 | 2,300 |

EXAMPLE 12

The polybutylene terephthalate "PBT1100" (the melt viscosity at 250° C.: 4,000 poise) produced by Toray Industries, Inc. is extruded at 270° C. around the glass multifilament "RS57PR-452SS" (the diameter of a single filament: 13 μm, the number of filaments: 1,700) produced by Nittobo Glass Fiber Co., Ltd., and a glass multifilament coated with the polybutylene terephthalate, having glass fiber content of 40 vol.%, is obtained. After the glass multifilament obtained is preheated to a temperature of 270° C. by a far infrared radiation heater, the glass multifilament is pressed by a pair of rollers heated at 270° C. to form a tape having the width of 6 mm and the thickness of 0.09 mm.

The tape obtained is cut to make strip pieces impregnated with polybutylene terephthalate and having the length of 25 mm. The strip pieces are distributed in a cavity of a mold, and compression molded at 260° C. to form an FRTP plate having the thickness of 3 mm.

According to ASTM-D-790 and D-256, the samples are made from the FRTP plate, and the flexural strength, flexural modulus and Izod impact value of the FRTP plate are determined as shown in Table 7.

EXAMPLE 13

The polyether sulfone "VICTREX" 4100G (the melt viscosity at 350° C.: 10,000 poise) produced by Imperial Chemical Industries, PLC. is extruded at 375° C. around the bundle of carbon fibers "TORAYCA" T300-6K produced by Toray Industries, Inc. and a bundle of carbon fibers coated with the polyether sulfone, having carbon fiber content of 40 vol.%, is obtained. After the carbon fiber bundle obtained is preheated to a temperature of 380° C. by a far infrared radiation heater, the bundle is pressed by a pair of rollers heated at 350° C. to form a tape having the width of 6 mm and the thickness of 0.09 mm.

The tape obtained is cut to make strip pieces impregnated with polyether sulfone and having the length of 25 mm. The strip pieces are distributed in a cavity of mold, and compression molded at 375° C. to form an FRTP plate having the thickness of 3 mm.

The flexural strength, flexural modulus and Izod impact value of the FRTP plate are determined in the same manner as that in Example 12 and the resulted data are shown in Table 7.

EXAMPLE 14

The polyether imide "ULTEM" 1000 (melt viscosity at 370° C.: 10,000 poise) produced by General Electrics Co. Ltd. is extruded at 375° C. around the bundle of carbon fibers "TORAYCA" T300-6K and a carbon fiber bundle coated with the polyether imide, having carbon fiber content of 40 vol.%, is obtained. After the carbon fiber bundle obtained is preheated to a temperature of 380° C. by a far infrared radiation heater, the bundle is pressed by a pair of rollers heated at 360° C. to form a tape having the width of 6 mm and the thickness of 0.09 mm.

The tape obtained is cut to make strip pieces impregnated with polyether imide and having the length of 25 mm. The strip pieces are distributed in a cavity of a mold, and compression molded at 375° C. to form an FRTP plate having the thickness of 3 mm.

The flexural strength, flexural modulus and Izod impact value of the FRTP plate are determined in the same manner as that in Example 12 and the resulted data are shown in Table 7.

EXAMPLE 15

An FRTP plate is formed in the same manner as that in Example 2 other than using nylon 6 "AMILAN" CM1016-K (the melt viscosity at 250° C.: 3,000 poise) produced by Toray Industries, Inc.

According to ASTM-D-790 and D-256, the samples are made from the FRTP plate, and the flexural strength, flexural modulus and Izod impact value of the FRTP plate are determined as shown in Table 7.

EXAMPLE 16

An FRTP plate is formed in the same manner as that in Example 15 other than using the bundle of carbon fibers "TORAYCA" T300-6K. The flexural strength, flexural modulus and Izod impact value are determined in the same manner as that in Example 12 and the resulted data are shown in Table 7.

In all these Examples 12 to 16, the FRTP plates having high strength, high rigidity and high impact resistance as shown in Table 7.

TABLE 7

|  | Flexural strength (kgf/mm$^2$) | Flexural modulus (kgf/mm$^2$) | Izod impact value (kgf.cm/cm$^2$) |
| --- | --- | --- | --- |
| Ex. 12 | 37 | 1310 | 95 |
| Ex. 13 | 45 | 2370 | 42 |
| Ex. 14 | 47 | 2460 | 39 |
| Ex. 15 | 31 | 1300 | 130 |
| Ex. 16 | 40 | 2300 | 41 |

EXAMPLE 17

The strip pieces of glass fibers impregnated with nylon 6 which are obtained in Example 15 and the strip pieces of carbon fibers impregnated with nylon 6 which are obtained in Example 16 are mixed at the ratios of 30, 50 and 70 vol.%, and the mixed strip pieces are distributed in a cavity of a mold and compression molded at 260° C. to form three kinds of FRTP plates with the different volume contents of glass fibers and carbon fibers which have the thickness of 3 mm.

The flexural strength, flexural modulus and Izod impact value of the respective FRTP plates are determined according to ASTM-D-790 and D-256. The resulted data are shown in Table 8. As shown in Table 8, the FRTP plate simultaneously having two or more kinds of excellent mechanical properties can be obtained by combining the different kinds of reinforcing fibers.

TABLE 8

|  | Mixing ratio (vol. %) | | |
| --- | --- | --- | --- |
| Strip pieces of Ex. 15 | 30 | 50 | 70 |
| Strip pieces of Ex. 16 | 70 | 50 | 30 |
| Flexural strength (kgf/mm$^2$) | 39 | 34 | 31 |
| Flexural modulus (kgf/mm$^2$) | 2000 | 1700 | 1400 |
| Izod impact value (kgf.cm/cm$^2$) | 74 | 84 | 110 |

Next, various FRTP products according to the present invention are explained with reference to the drawings.

Since the FRTP plates according to the present are excellent quasi-isotropic, and they have high mechanical properties such as flexural strength, flexural modulus and impact resistance and good fittability, various FRTP products having high mechanical properties and in which reinforcing fibers are uniformly distributed can be easily molded even if the FRTP products have complicated shapes.

EXAMPLE 18

Figure 6A:
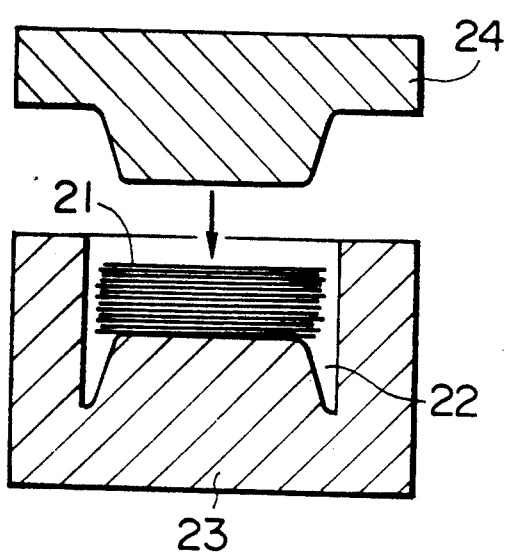
FIGS. 6A and 6B are vertical sectional views of molds and composite plates showing the molding of an FRTP product according to an embodiment of the present invention.
Figure 6B:
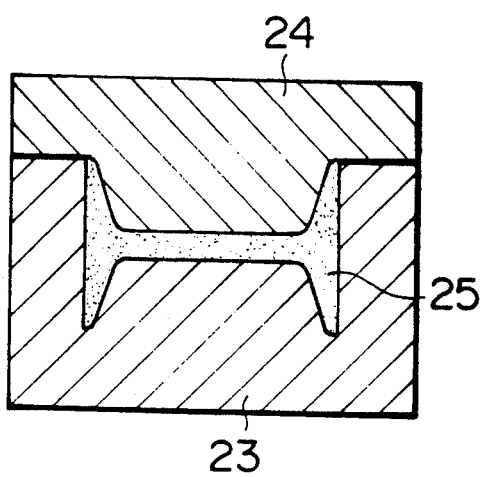
Figure 6C:
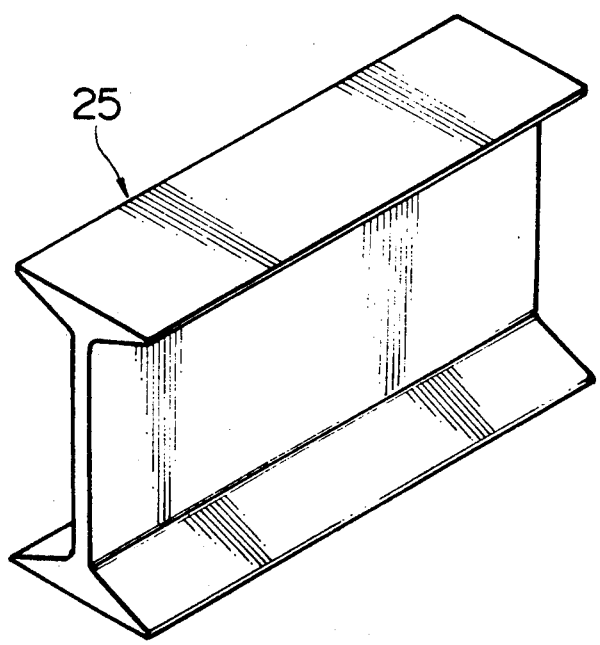
FIG. 6C is a perspective view of the molded FRTP product.

The FRTP plates obtained in Example 16 are preheated to a temperature of 260° C. by a hot blast oven, and the preheated FRTP plates 21 are stacked in a cavity 22 of a lower mold 23 as shown in FIG. 6A. An upper mold 24 is closed, and the FRTP plates are molded to an H-type channel 25 as an FRTP product by the compression molding by molds 23 and 24 heated at 250° C. as shown in FIG. 6B. The channel 25 obtained (FIG. 6C) has good quasi-isotropic and high mechanical properties. Even if rivet holes are defined on channel 25, the bearing strength of the portions around the rivet holes can be sufficiently high.

EXAMPLE 19

Figure 7A:
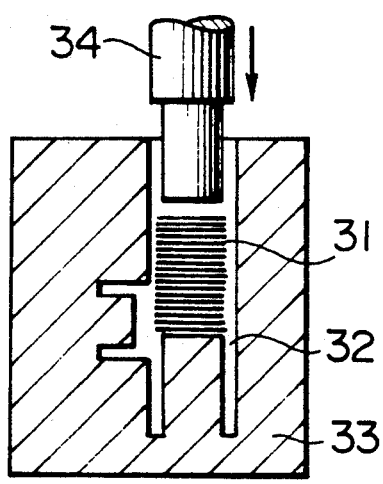
FIGS. 7A and 7B are vertical sectional views of molds and composite plates showing the molding of another FRTP product according to another embodiment of the present invention.
Figure 7B:
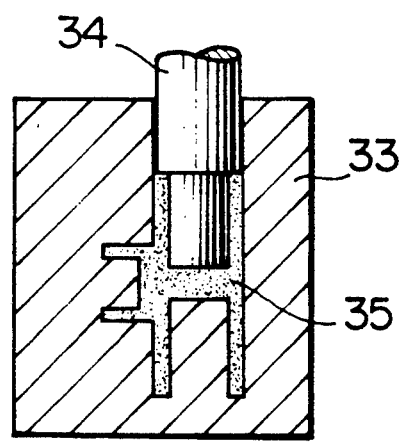
Figure 7C:
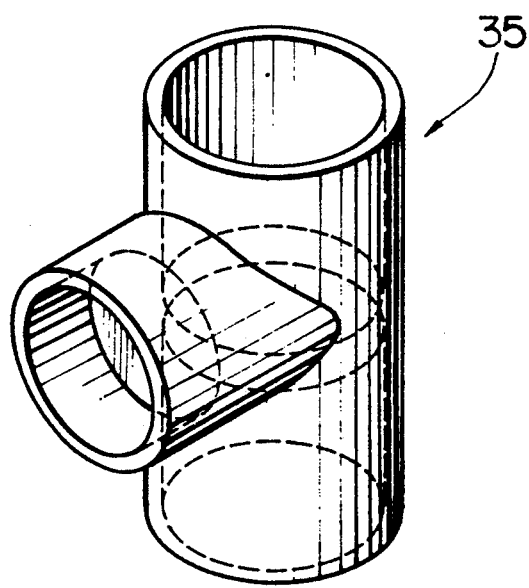
FIG. 7C is a perspective view of the molded FRTP product.

The FRTP plates obtained in Example 16 are preheated to a temperature of 280° C. by a hot blast oven, and the preheated FRTP plates 31 are stacked in a cavity 32 of a lower mold 33 as shown in FIG. 7A. A piston or rod type upper mold 34 is inserted into the cavity, and the FRTP plates are molded to a pipe joint 35 by the compression molding by molds 33 and 34 heated at 250° C. as shown in FIG. 7B. The pipe joint 35 obtained (FIG. 7C) is used, for example, for the frame of a bicycle.

EXAMPLE 20

Figure 8A:
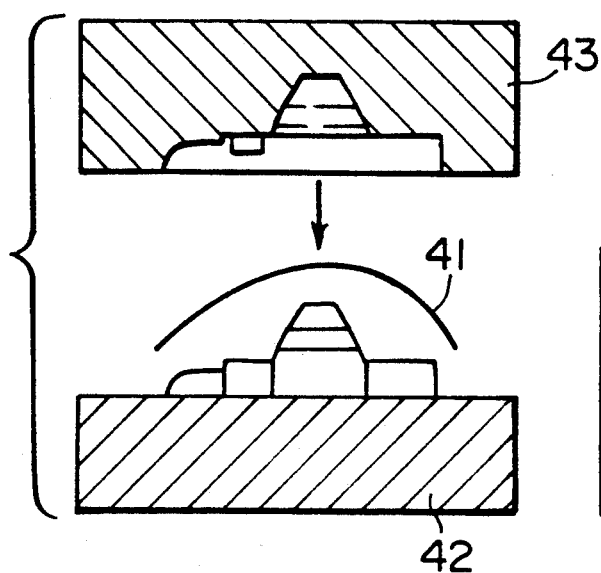
FIGS. 8A and 8B are vertical sectional views of molds and composite plates showing the molding of a further FRTP product according to a further embodiment of the present invention.
Figure 8B:
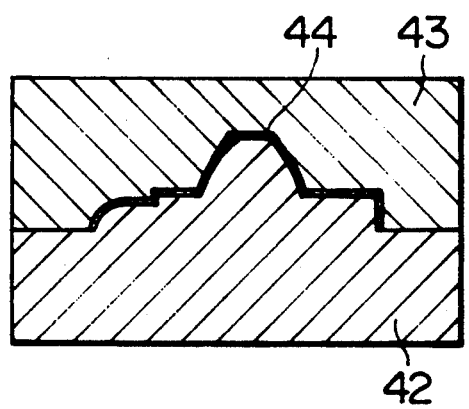
Figure 8C:
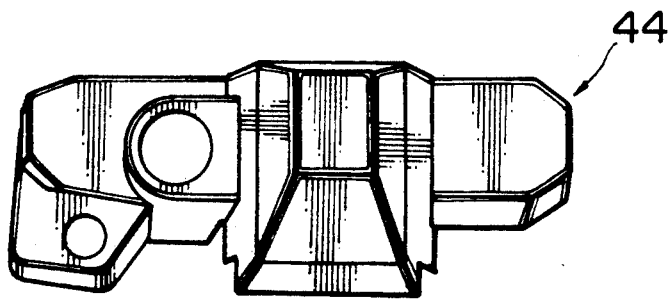
FIG. 8C is a plan view of the molded FRTP product and FIG. 8D is an elevational view of the molded FRTP product.
Figure 8D:
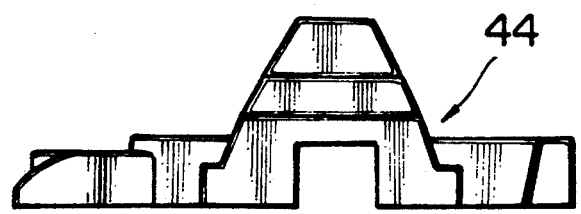

The FRTP plate obtained in Example 16 is preheated to a temperature of 280° C. by a hot blast oven, and the preheated FRTP plate 41 is placed between molds 42 and 43 heated at 200° C. as shown in FIG. 8A. Molds 42 and 43 are closed, and the FRTP plate is molded to an upper casing 44 of a camera by stamping molding method as shown in FIG. 8B. The upper casing 44 obtained (FIGS. 8C and 8D) has good quasi-isotropic and high mechanical properties even if it is relatively thin.

EXAMPLE 21

Figure 9A:
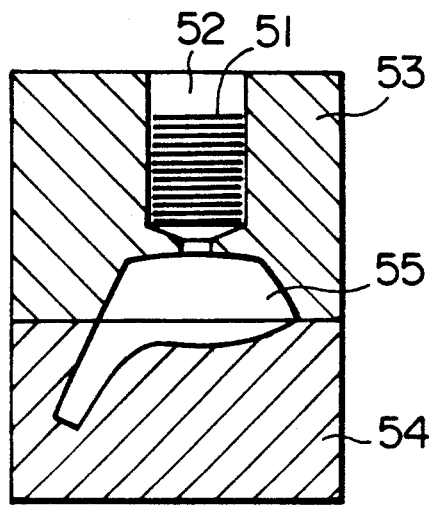
FIGS. 9A and 9B are vertical sectional views of molds and composite plates showing the molding of a further FRTP product according to a further embodiment of the present invention.
Figure 9B:
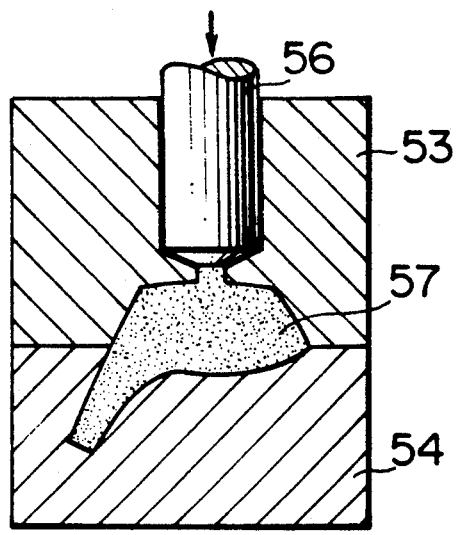
Figure 9C:
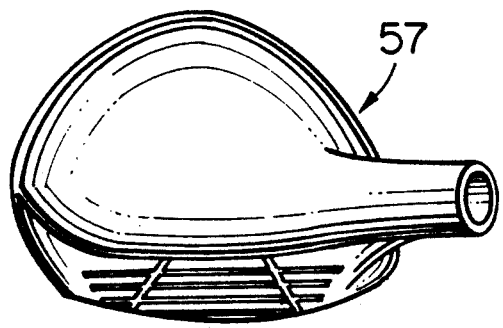
FIG. 9C is a plan view of the molded FRTP product and FIG. 9D is an elevational view of the molded FRTP product.
Figure 9D:
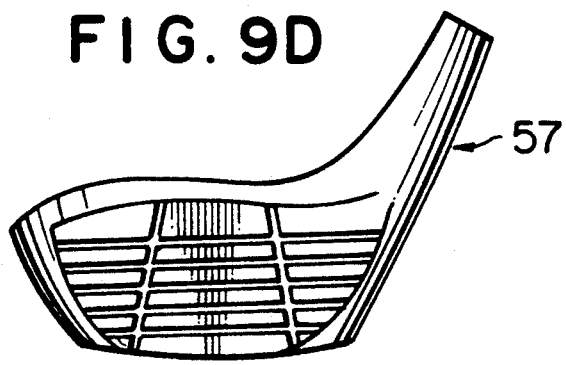

The FRTP plates with appropriate length and width obtained in Example 8 are preheated to a temperature of 280° C., and the preheated FRTP plates 51 are stacked in a pot 52 formed in an upper mold 53 as shown in FIG. 9A. The FRTP plates 51 are pressed by a plunger 56 and transferred into a cavity 55 formed between upper mold 53 and a lower mold heated at 200° C. to mold a head 57 of a golf club by transfer molding as shown in FIG. 9B. The head 57 obtained (FIGS. 9C and 9D) has good quasi-isotropic and high mechanical properties.

EXAMPLE 22

The FRTP plates obtained in Example 8 are preheated at 280° C., and the preheated FRTP plates 61 are stacked in a pot 62 formed in a mold 63 as shown in FIG. 10A. The FRTP plates 61 are pressed by a plunger 64 and transferred into a cavity 65 formed in mold 63 heated at 200° C. to mold a casing 66 of a reel for fishing by transfer molding as shown in FIG. 10B. The casing 66 obtained (FIGS. 10C and 10D) also has good quasi-isotropic and high mechanical properties.

EXAMPLE 23

Figure 11A:
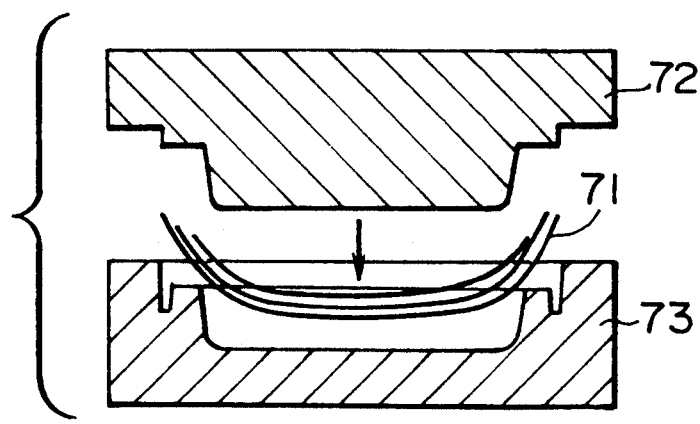
FIGS. 11A and 11B are vertical sectional views of molds and composite plates showing the molding of a further FRTP product according to a further embodiment of the present invention.
Figure 11B:
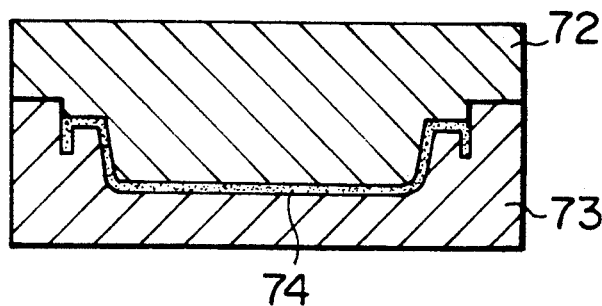
Figure 11C:
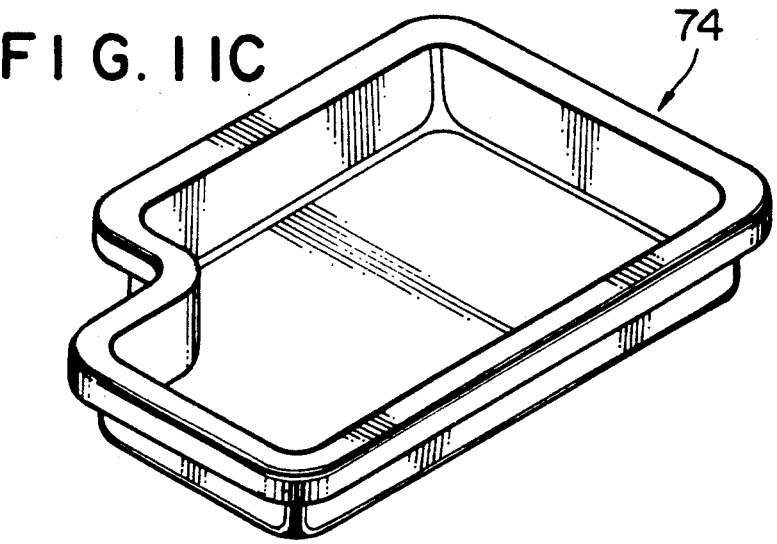
FIG. 11C is a perspective view of the molded FRTP product.

The FRTP plates obtained in Example 3 are preheated to a temperature of 280° C. by a hot blast oven, and the preheated FRTP plates 71 are stacked and placed between molds 72 and 73 heated at 180° C. as shown in FIG. 11A. The molds 72 and 73 are closed, and the FRTP plates are molded to an oil pan 74 of an engine by stamping molding method as shown in FIG. 11B. The oil pan 74 obtained (FIG. 11C) can have high mechanical properties in any portion thereof.

EXAMPLE 24

Figure 12A:
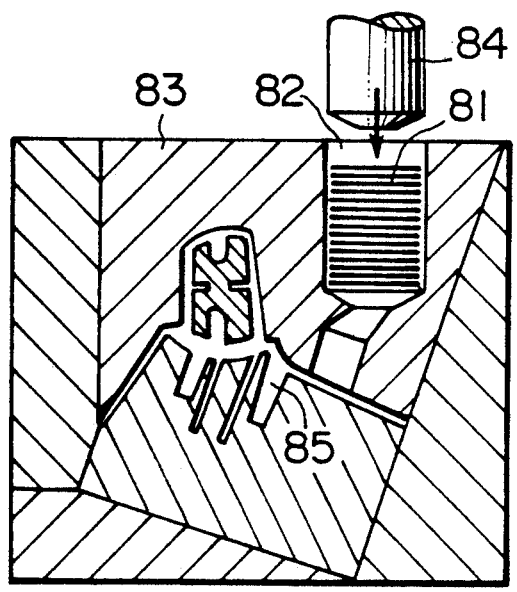
FIGS. 12A and 12B are vertical sectional views of molds and composite plates showing the molding of a further FRTP product according to a further embodiment of the present invention.
Figure 12B:
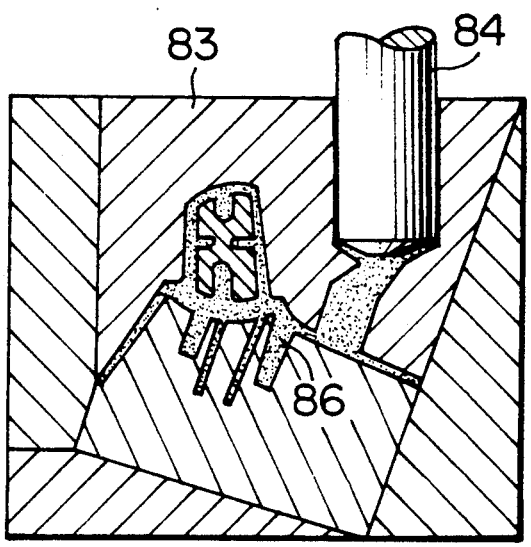
Figure 12C:
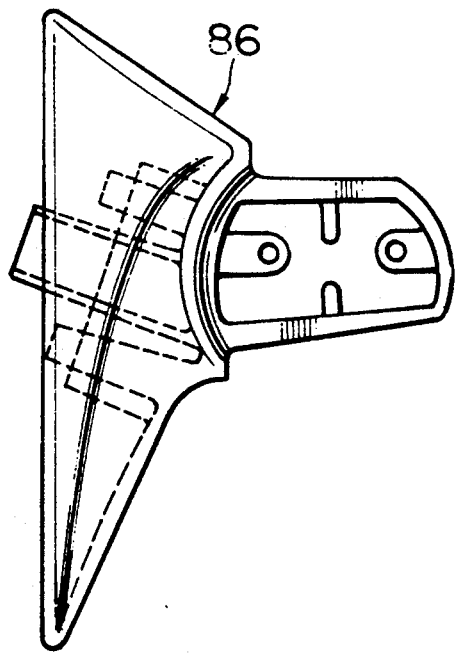
FIG. 12C is a plan view of the molded FRTP product and FIG. 12D is a side view of the molded FRTP product.
Figure 12D:
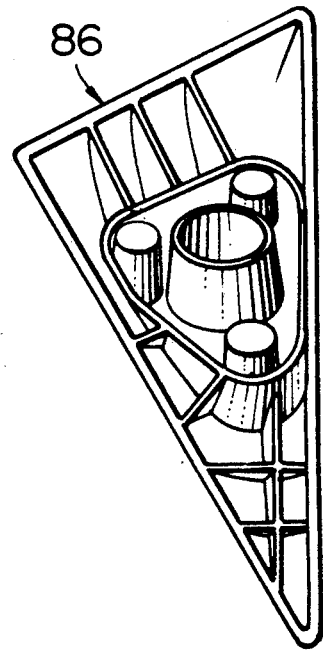

The FRTP plates obtained in Example 1 are preheated to a temperature of 280° C. by a hot blast oven, and the preheated FRTP plates 81 are stacked in a pot 82 formed in a mold 83 heated at 180° C. as shown in FIG. 12A. The FRTP plates 81 are pressed by a plunger 84 and transferred into a cavity 85 to mold a base 86 of a door mirror equipment for a vehicle by transfer molding as shown in FIG. 12B. Although the base (FIGS. 12C and 12D) has a relatively complicated shape, the base can be easily molded and the base obtained can have good quasi-isotropic and high mechanical properties.

EXAMPLE 25

Figure 13A:
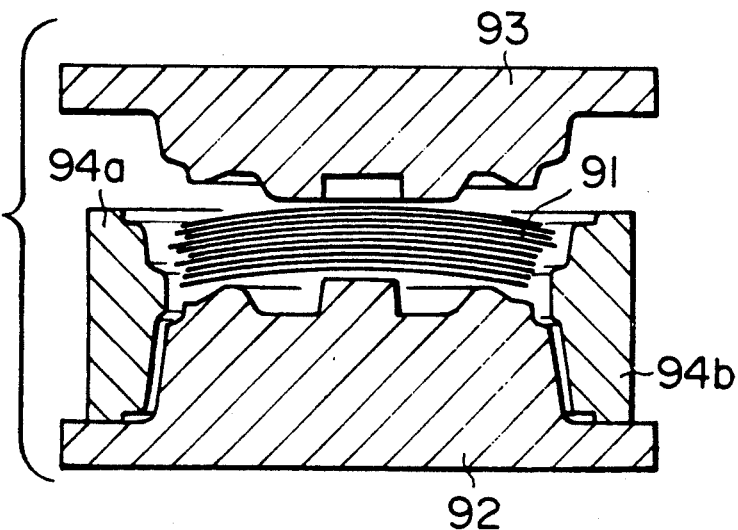
FIGS. 13A and 13B are vertical sectional views of molds and composite plates showing the molding of a further FRTP product according to a further embodiment of the present invention.
Figure 13B:
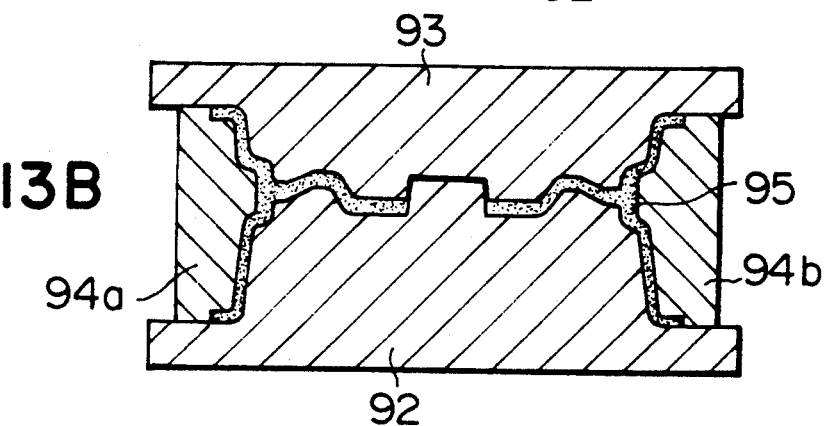
Figure 13C:
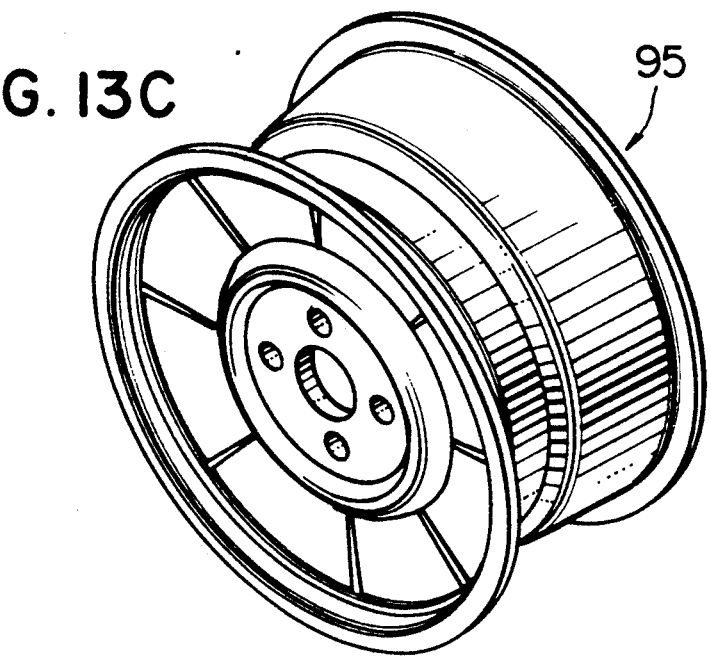
FIG. 13C is a perspective view of the molded FRTP product.

The FRTP plates obtained in Example 14 and cut in a circular shape are preheated to a temperature of 400° C. by a hot blast oven, and the preheated FRTP plates 91 are stacked on a lower mold 92 as shown in FIG. 13A. Lower mold 92, upper mold 93 and side molds 94a and 94b heated at 350° C. are closed, and the FRTP plates are molded to a wheel 95 for a vehicle by compression molding as shown in FIG. 13B. The wheel obtained (FIG. 13C) has excellent quasi-isotropic and excellent mechanical properties of flexural strength, flexural modulus and impact strength.

EXAMPLE 26

Figure 14A:
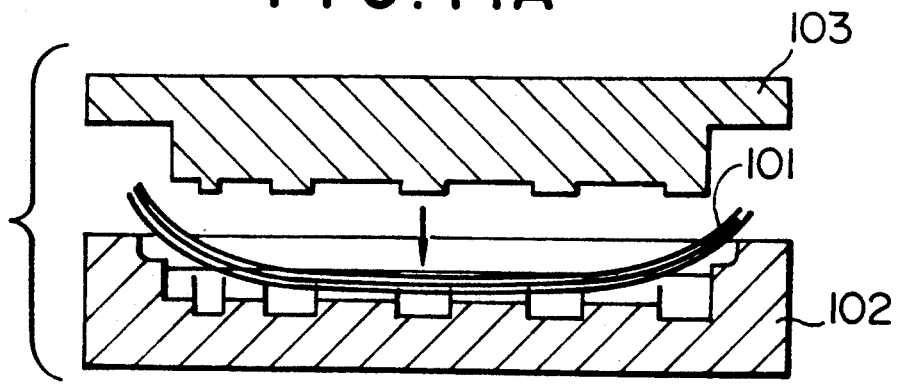
FIGS. 14A and 14B are vertical sectional views of molds and composite plates showing the molding of a further FRTP product according to a further embodiment of the present invention.
Figure 14B:
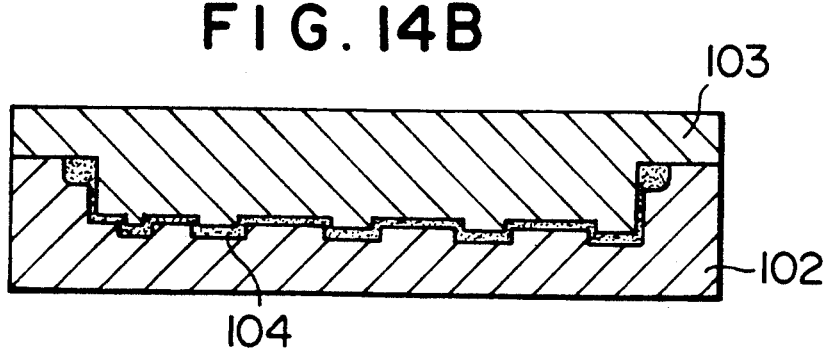
Figure 14C:
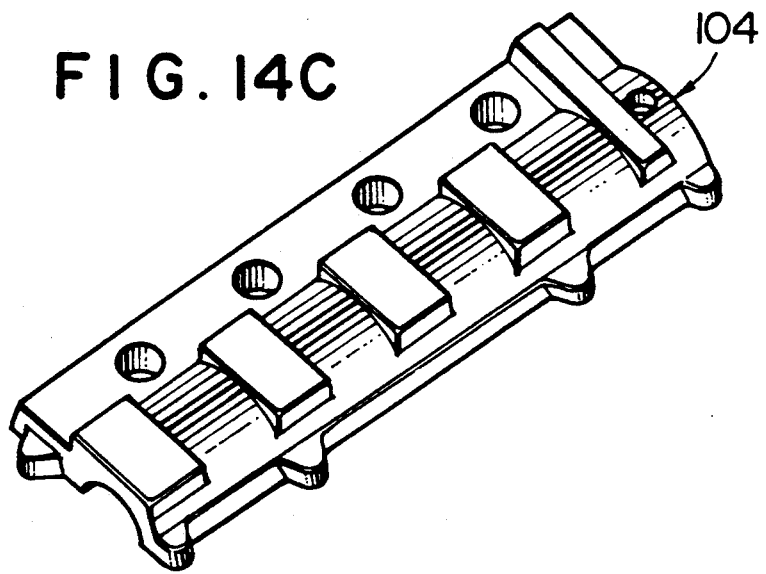
FIG. 14C is a perspective view of the molded FRTP product.

The FRTP plates obtained in Example 15 are preheated to a temperature of 280° C. by a hot blast oven, and the preheated FRTP plates 101 are stacked and placed between molds 102 and 103 heated at 200° C. as shown in FIG. 14A. Molds 102 and 103 are closed to mold a cylinder head cover 104 by stamping molding method as shown in FIG. 14B. The cylinder head cover obtained (FIG. 14C) has good quasi-isotropic and excellent mechanical properties.

Although several concrete FRTP products have been explained in Examples 18 to 26, the FRTP plates according to the present invention can be used for molding other structural FRTP products which require good quasi-isotropic and high mechanical properties.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A thermoplastic composite plate material having a quasi isotropy, wherein the mechanical properties of the plate material in any two directions perpendicular to each other and in a direction having an angle of 45° to the two perpendicular directions are each in the range of ±10%, the plate material comprising:

a thermoplastic polyether-imide resin having a melt viscosity of 1,000–15,000 poise at the temperature at which said composite plate material is formed; and strip pieces each constructed of unidirectionally oriented reinforcing fibers selected from the group consisting of carbon fibers, glass fibers and polyaramid fibers, said strip pieces being randomly distributed in a plane parallel to a surface of said composite plate material, each of said strip pieces having the following dimensions:

(a) a thickness not greater than 0.1 mm,
(b) a width in the direction perpendicular to the reinforcing fibers' orientated direction of from 5 to 20 mm,
(c) a length in the reinforcing fibers' orientated direction of from 5 to 30 mm, and
(d) a ratio of said width of said length of from 0.2 to 1.0;

the composite plate material having a thickness of from 2 to 10 mm and a content of said reinforcing fibers therein of from 30 to 50% v/v.

2. A molded product comprising at least one composite plate material, the composite plate material having a quasi isotropy in plane thereof, wherein the mechanical properties of the plate material in any two directions perpendicular to each other and in a direction having an angle of 45° to the two perpendicular directions are each in the range of ±10%, the plate material comprising:

a thermoplastic polyether-imide resin having a melt viscosity of 1,000-15,000 poise at the temperature at which said composite plate material is formed; and strip pieces each constructed of unidirectionally orientated reinforcing fibers selected from the group consisting of carbon fibers, glass fibers and polyaramid fibers, said strip pieces being randomly distributed in a plane parallel to a surface of said composite plate material, each of said strip pieces having the following dimensions:

(a) a thickness not greater than 0.,1 mm,
(b) a width in the direction perpendicular to the reinforcing fibers' orientated direction of from 5 to 20 mm,
(c) the length in the reinforcing fibers' orientated direction of from 5 to 30 mm, and
(d) a ratio of said width to said length of from 0.2 to 1.0;

the composite plate material having a thickness of from 2 to 10 mm and a content of said reinforcing fibers therein of from 30 to 50% v/v.

3. The composite plate material of claim 1 or 2, wherein the length of each of said strip pieces is in the range of 10-25 mm.

4. The composite plate material of claim 1 or 2, wherein the melt viscosity of said thermoplastic resin at the temperature which said composite plate material is formed is in the range of 2,000-10,000 poise.

5. The product of claim 1 or 2, wherein said molded product is a pipe joint for the frame of a bicycle.

6. The product of claim 1 or 2, wherein said molded product is an upper casing of a camera.

7. The product of claim 1 or 2, wherein said molded product is an oil pan of an engine.

8. The product of claim 1 or 2, wherein said molded product is a base of a door mirror equipment for a vehicle.

9. The product of claim 1 or 2, wherein said molded product is a wheel for a vehicle.

10. The product of claim 1 or 2, wherein said molded product is a cylinder head cover of an engine.

* * * * *